United States Patent [19]
Rottenberger

[11] Patent Number: 5,788,030
[45] Date of Patent: Aug. 4, 1998

[54] VIBRATION DAMPER WITH ADJUSTABLE DAMPING FORCE

[75] Inventor: Theo Rottenberger, Burkardroth-Gefäll, Germany

[73] Assignee: Fichtel & Sachs AG, Schweinfurt, Germany

[21] Appl. No.: 566,351

[22] Filed: Dec. 1, 1995

[30] Foreign Application Priority Data

Dec. 3, 1994 [DE] Germany .......................... 44 43 109.0
Nov. 14, 1995 [DE] Germany .......................... 195 42 293.7

[51] Int. Cl.$^6$ .................................................. F16F 9/46
[52] U.S. Cl. ................... 188/299; 188/322.13; 280/707
[58] Field of Search ........................... 188/299, 318, 188/322.13, 282, 319; 280/707, 714

[56] References Cited

U.S. PATENT DOCUMENTS

| | | |
|---|---|---|
| 1,967,169 | 7/1934 | Armstrong . |
| 4,164,274 | 8/1979 | Schupner . |
| 4,802,561 | 2/1989 | Knecht et al. ...................... 188/318 |
| 4,936,424 | 6/1990 | Costa . |
| 4,958,706 | 9/1990 | Richardson et al. . |
| 4,986,393 | 1/1991 | Preukschat et al. ................. 188/318 X |
| 5,078,241 | 1/1992 | Ackermann et al. . |
| 5,431,259 | 7/1995 | Mizutani et al. .................... 188/318 X |
| 5,439,085 | 8/1995 | Woessner ............................ 188/299 |
| 5,586,627 | 12/1996 | Nezu et al. ......................... 188/318 X |

FOREIGN PATENT DOCUMENTS

| | | |
|---|---|---|
| 0202941 | 11/1986 | European Pat. Off. . |
| 0542282 | 5/1993 | European Pat. Off. . |
| 1299286 | 6/1962 | France . |
| 2418390 | 9/1979 | France . |
| 0524044 | 5/1931 | Germany . |
| 0602609 | 9/1934 | Germany . |
| 2113948 | 10/1971 | Germany . |
| 2242990 | 3/1974 | Germany . |
| 2757711 | 6/1979 | Germany . |
| 3535287 | 4/1987 | Germany . |
| 3542097 | 6/1987 | Germany . |
| 3543291 | 6/1987 | Germany . |
| 3605182 | 8/1987 | Germany . |
| 3914297 | 10/1990 | Germany . |
| 4137176 | 5/1993 | Germany . |
| 404015182 | 1/1992 | Japan ................................. 188/318 |
| 1354385 | 5/1974 | United Kingdom . |
| 9412360 | 6/1994 | WIPO . |

*Primary Examiner*—Lee W. Young
*Assistant Examiner*—Pamela J. Lipka
*Attorney, Agent, or Firm*—Nils H. Ljungman and Associates

[57] ABSTRACT

Vibration damper with adjustable damping force comprising a cylinder in which a piston with a piston rod is guided so that it can move axially, whereby the piston divides the cylinder into a first and a second working chamber, with at least one damping valve which is located in a flow connection between the two working chambers and can be influenced in terms of its damping force response curve by means of external adjustment means, whereby the damping valve consists of single valves, the action of which is cumulative, whereby a first single valve consists of a throttle which has a small cross section, and a second single valve comprises at least one valve disc which is under a spring load, and whereby the action of the first and second single valves can be adjusted individually by adjustment means. The single valves for at least one direction of flow are located in a valve block which is in communication with the cylinder by means of at least one fluid connection, whereby the container tube is realized in two parts which extend respectively above and below the valve block. The realization of the container tube in two parts allows for twisting of the valve block at the junction points of the container tube and valve block, so as to take into consideration the amount of space available for the installation of the vibration damper.

18 Claims, 4 Drawing Sheets

5,788,030

VIBRATION DAMPER WITH ADJUSTABLE DAMPING FORCE

BACKGROUND OF THE INVENTION

1. Field of the Invention

This present invention generally relates to a vibration damper with adjustable damping force and/or adjustable valve block positioning.

2. Background Information

A similar vibration damper is disclosed, for example, in German Patent No. 39 14 297. On this vibration damper, the bias of a spring disc packet which effects the damping in the vibration damper can be modified by means of a mechanical or other adjustment device. But the influence on the damping force response curve is limited to a relatively small range which is usually insufficient to meet the requirements of very demanding applications such as those which occur in competitive racing, for example.

One basic problem of the adjustable vibration damper is that its use is essentially limited to a relatively small total number of a relatively wide variety of vehicles. The result is that the manufacture of such adjustable vibration dampers is essentially expensive, because it is essentially impossible to manufacture one standard damper for all vehicles, on account of differences in space requirements in the individual vehicles.

OBJECT OF THE INVENTION

The object of the present invention is to realize a vibration damper, the damping force response curve of which can be made very variable by means of adjustment means which are located outside the vibration damper, whereby adaptation capabilities are provided on the vibration damper to take into consideration the amount of space available for its installation.

SUMMARY OF THE INVENTION

The present invention teaches that this object can be achieved in accordance with at least one preferred embodiment, if the damping valve comprises single or individual valves, the action of which is cumulative, whereby a first single valve comprises a throttle which has a small cross section, and a second individual valve comprises at least one valve disc which is under a spring load, whereby the action of the first and the second single valves can preferably be adjusted individually by means of the adjustment means, thereby essentially making it possible to obtain maximum variability in the design of the valve response curve. In contrast to similar known devices, each individual portion of the response curve or characteristic which corresponds to lower or higher operating pressures can be set individually.

In an additional embodiment, the area of the response curve can be divided into at least three parts, if an additional single valve is realized in the form of a throttle passage which has a larger cross section, whereby the action of the additional single valves can also be adjusted by means of adjustment means. The portion of the response curve which corresponds to higher flow velocities in the vibration damper can be adjusted in terms of its progressivity to meet the specific requirements.

As indicated in an additional advantageous embodiment of the present invention, there can be respective separate damping valves for the decompression and compression directions for the second single valve and the additional single valves. Consequently, there is also a functional separation of the adjustment capabilities for the decompression and compression directions.

If, for certain reasons, it is desired that the response curve of the first single valve should not be identical for the decompression and compression directions, there can be separate first single valves for the decompression and compression directions which are actively connected to non-return valves.

In another favorable embodiment, the throttle of the first single valve can be adjusted by means of a regulating needle. A conical needle tip essentially ensures a high degree of adjustment precision. In an additional configuration, the throttle of the first single valve can be provided with a spring-loaded closing body. The spring bias of at least one of the springs which acts on a valve body can thereby be adjusted. The additional individual valve has a regulating screw which can be used to change the cross section of the passage. Each adjustment has a direct effect on the valve, so that translations and the consequent transmission errors can be prevented.

The vibration damper comprises a cylinder in which a piston with a piston rod is guided so that it can move axially, whereby the piston divides the cylinder into a first and a second working chamber, with at least one damping valve. The damping valve is located in a flow connection between the two working chambers and can be influenced in terms of its damping force response curve by means of external adjustment means, so that the vibration damper can essentially meet the space requirements of a particular vehicle. To make individual adjustments to the vibration damper, the invention teaches that the single valves for at least one flow direction can be located in a valve block. The valve block can be in communication with the cylinder by means of at least one fluid connection, whereby the container tube is realized in two pieces, so that the respective parts of the container tube extend above and below the valve block. The split container tube makes it possible to rotate each of the valve blocks individually, so that the single valves located outside the container tube can be adjusted. A problem which may be experienced on similar known devices, e.g. when the rim with the tire blocks the space required for the valves, can essentially be eliminated simply by twisting or rotating the valve block. It thereby can preferably be possible to drastically reduce the number of different models of the damping valve required to meet the installation requirements of individual vehicle models.

The valve block serves as the adjustment element for the second single valve, in that the spring is supported on a housing cap of the valve block which can be adjusted axially.

As disclosed in one advantageous embodiment, the fluid connection can be formed by a container tube which surrounds the cylinder. The working chambers also each have at least one connection opening to the fluid connection. It is thus essentially impossible for the vibration damper to be hydraulically blocked. The piston can be realized so that its function is as a simple displacement body, without damping valves.

The valve block can have a central opening to hold the cylinder, and also contains passages to the individual valves which run radially from this central opening. The valve block on the vibration damper is centered by means of, or over, the central opening.

The piston can have at least one throttled fluid connection between the working chambers, so that a pressure limiting action can be exercised which can provide protection against undesirable damping force peaks in the vibration damper.

The present invention teaches that the vibration damper is preferably constructed in the form of a single tube damper, in the cylinder of which a gas-filled compensation chamber is realized by means of a separating piston, whereby a stop forms a stroke limit for the separating piston. The stop prevents the separating piston from running over the connection opening of the working chamber which is next to the compensation chamber, in which case the separating piston would become ineffective.

To reduce the weight of the vibration damper, the invention teaches that the container tube can be made of aluminum. The difference in material between the steel cylinder and the aluminum container tube also increases the bias during operation of the damper.

As disclosed in an additional favorable embodiment, the cylinder can have an expanded diameter in the vicinity of the central opening of the valve block. A ring gasket or O-ring is inserted into the valve block inside the central opening. The purpose of the expanded diameter of the cylinder is to prevent the ring gasket from being pushed into the upper working chamber through the connection openings during assembly.

One advantageous configuration of an expanded diameter can be formed by a sleeve which is pushed onto the cylinder. For small production runs in particular, it can therefore essentially be unnecessary to use complex and expensive deformation tools and process steps.

In an additional configuration, the cylinder can have an encircling fastening edge or flange which forms a fastening connection with the lower part of the container tube. The fastening edge preferably stiffens the vibration damper and presents various possibilities for fastening, e.g. using a threaded connection or a bead.

The fastening edge can also comprise connection openings which provide communication between the lower working chamber and the valve block. If these connection openings run parallel to the cylinder, the connection openings do not reduce the stroke length of the piston. The present invention also teaches that the fastening edge and the sleeve can be realized as one piece. Preferably, this one-piece design can significantly simplify the fastening of the vicinity of the increased outside diameter.

In one embodiment, the separating piston can be located so that it slides inside the container tube. The open cylinder or the fastening edge act as a stop. The separating piston, which is independent of the diameter of the cylinder, preferably permits a larger diameter and thus a greater damping force, since the pressurized surface area in the gas-filled equalization chamber is larger.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a vibration damper with adjustable damping force comprising a cylinder in which a piston with a piston rod is guided so that it can move axially, whereby the piston divides the cylinder into a first and a second working chamber, and at least one damping valve which is located in a flow connection between the two working chambers and can be influenced in terms of its damping force response curve by means of external adjustment means, characterized by the fact that the damping valve consists of single or individual valves, the action of which is cumulative, whereby a first single valve consists of a throttle which has a small cross section, and a second single valve comprises at least one valve disc which is under a spring load, and whereby the action of the first and second single valves can be adjusted individually by means of the adjustment means.

Another aspect of the present invention resides broadly in a vibration damper with adjustable damping force, comprising a cylinder in which a piston with a piston rod is guided so that it can move axially, whereby the piston divides the cylinder into a first and a second working chamber, and at least one damping valve which is located in a flow connection between the two working chambers and can be influenced in terms of its damping force response curve by means of external adjustment means, characterized by the fact that the single valves for at least one flow direction are located in a valve block which is in communication by means of at least one fluid connection with the cylinder, whereby the container tube is realized in two parts which extend respectively above and below the valve block.

BRIEF DESCRIPTION OF THE DRAWINGS

The present invention is explained in greater detail below with reference to the embodiments which are illustrated in the accompanying figures.

DESCRIPTION OF THE PREFERRED EMBODIMENT

Figure 1:
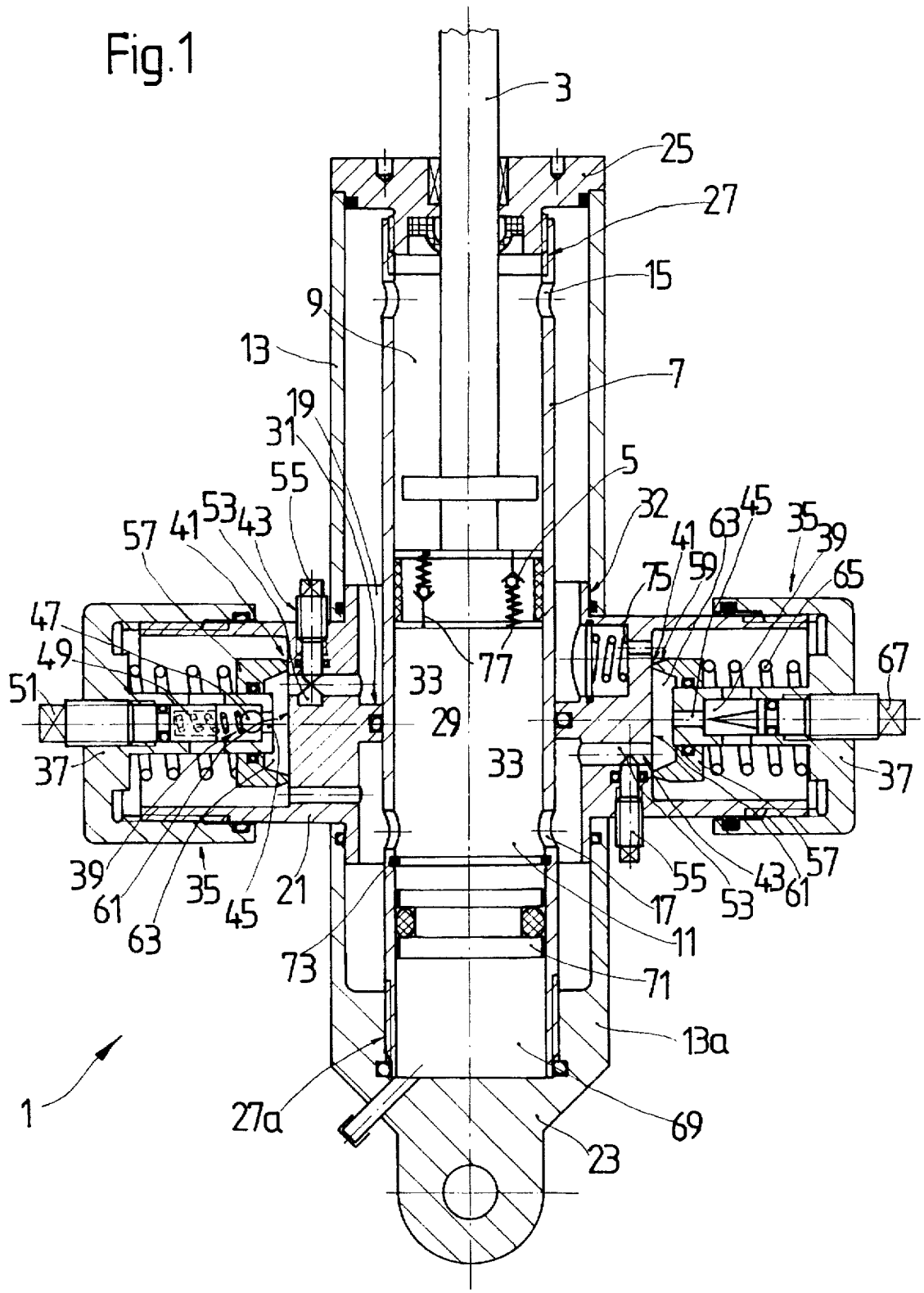
FIG. 1 shows a vibration damper which has two external valves.

FIG. 1 shows a vibration damper 1 in which a piston rod 3 with a piston 5 is preferably guided so that it can move axially inside a cylinder 7. The piston separates the cylinder into an upper and a lower working chamber 9; 11. A container tube 13; 13a preferably encloses the cylinder 7, thereby forming a ring-shaped chamber which, by means of connection openings 15; 17, can create a fluid connection 19 with a valve block 21. The container tube is probably realized in two pieces which extend respectively above and below the valve block.

A base 23 which is a component of the lower part of the container tube closes the cylinder. A cover 25 can preferably be reclosably fastened by means of a threaded connection 27 to the cylinder 7 on the piston rod outlet side. The valve block 21 is essentially centered by means of, or over, a central opening 29 on the cylinder, whereby the central opening can be formed by an encircling sealed web 31. In the respective upper and lower limit positions of the piston 5, there are preferably connection openings 15; 17, so that damping valves inside the valve block can be connected with the working chambers 9; 11 by means of passages 33 which run radially, and by the fluid connection 19. An additional threaded connection 27a between the cylinder 7 and the lower container tube part 13a can provide a clamped series which includes the cover 25, the upper container tube part 13, the valve block 21 and the lower container tube part 13a. Before the final fastening of the threaded connections, the valve block can be twisted into any desired position, e.g. to adapt it to meet any spatial requirements which may be encountered. In addition to the central opening 29, for centering purposes there can be a peripheral area 32 on the outside diameter of the valve block opposite or facing the inside diameter of the container tube parts.

Figure 1A:
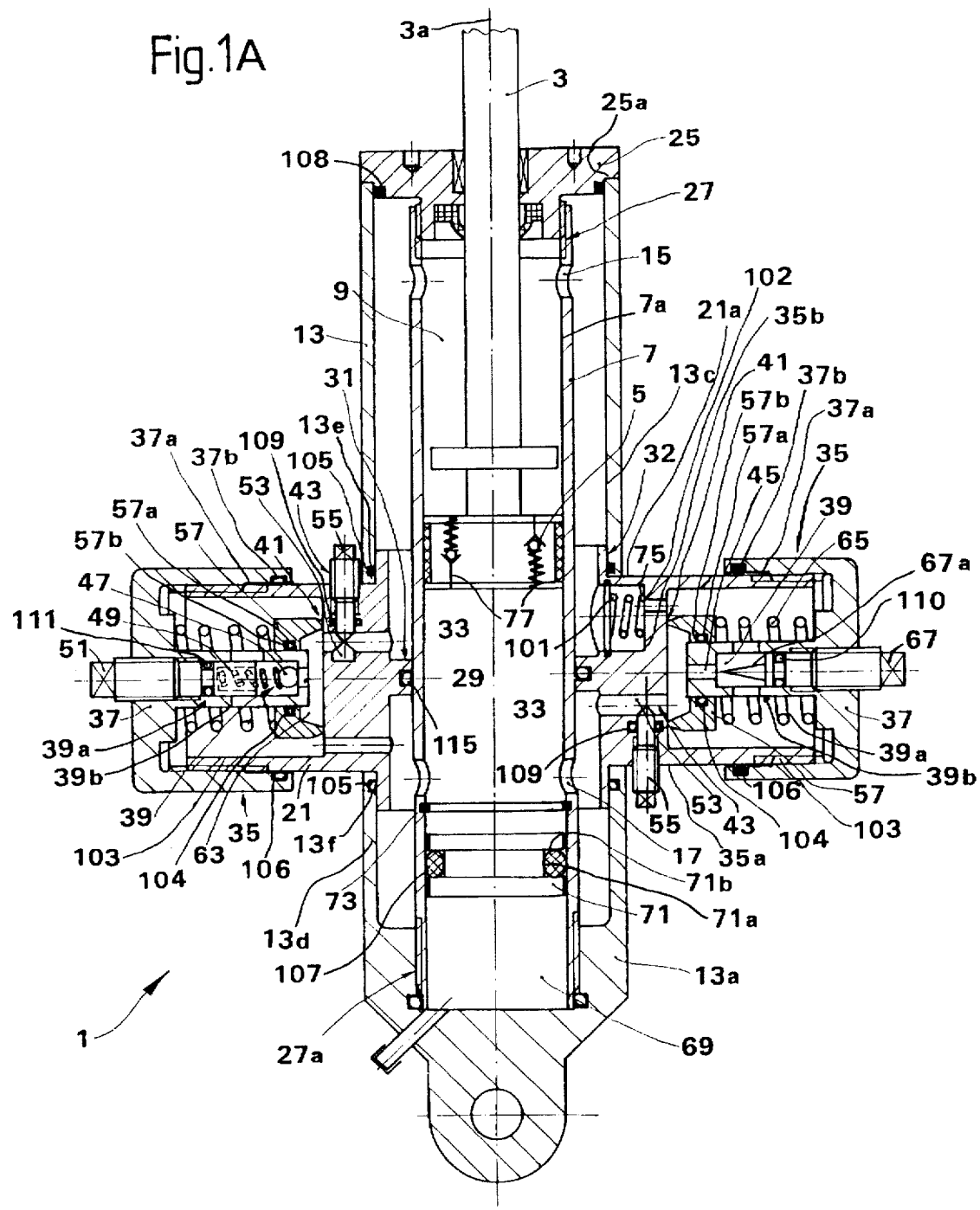
FIG. 1A. is essentially the same view as FIG. 1, but more detailed.

Referring now to FIG. 1A, preferably, both above and below the valve block 21, a seal, O-ring, or ring gasket 105 can be disposed in this peripheral area 32. These two seals 105 are placed between the outside diameter 21a of the valve block 21 and the inside diameters 13c and 13d of container tube parts 13 and 13a, respectively. The seals 105 are seated in corresponding circumferencial recesses 13e and 13f in the inside diameter 13c and 13d of the container tube parts 13 and 13a. These seals 105 preferably seal the junction points between the valve block 21 and the container tube parts 13 and 13a. These seals 105 can also allow the valve block 21 to be twisted about the longitudinal axis 3a of the piston rod 3 along the peripheral area 32, thereby providing adaptation capabilities so as to meet spatial requirements for installation. FIG. 1a also illustrates a seal, O-ring or ring gasket 115 which can be inserted in the sealed web 31 and which in at least one embodiment of the invention can be substantially similar to the ring gasket 81 illustrated in FIG. 2. This sealed web 31 is located about the central opening 29 on the cylinder 7. Additionally, an O-ring or weld 108 can be disposed between the interior wall 25a of the container tube cover 25 and the interior wall 13c on the container tube part 13, so as to effectively seal in place the cover 25.

The valve block can have two valve housings 35 which extend radially, and which can be closed on the ends by housing caps 37. Inside the valve housing there are preferably a first valve 39, a second valve 41 and an additional valve 43. The first valve 39 has only a small throttle cross section and forms the pilot cross section for the overall damping valve. In the left-hand valve housing 35 in the figure, the first valve 39 can comprise a throttle 45 which is preferably covered by a ball 47 with a closing spring 49. The bias of the closing springs can be individually adjusted by means of an adjustment screw 51. The first valve 39 can be connected in series with the additional valve 43, which can also be provided with a throttle 53 which has a cross section which is significantly larger than that of the first throttle 45. The throttle 53 preferable constitutes a radial component of what is otherwise a longitudinal passage 33. To adjust the additional valve 43 there is also a regulating screw 55 which can be turned to continuously adjust the throttle cross section by means of an axial movement of regulating screw 55.

Referring again to FIG. 1A, in the left-hand valve housing 35, a seal, O-ring or ring gasket 111 can be disposed in the first valve 39. This seal 111 is located within the valve guide 39a, to the left of closing spring 49. This seal 111 can provide a damping fluid seal. This seal 111 can also provide a guide structure for the adjustment screw 51. The bias of the closing springs 49 is preferably adjusted by means of the adjustment screw 51. Further, FIG. 1A illustrates, in both the left-hand and right-hand valve housings 35, the use of a seal, O-ring or ring gasket 109 in additional valve 43. This seal 109 is seated circumferencially around the regulating screw 55, and provides a seal, and possibly a guide for the movement of this regulating screw 55.

The second valve 41 can preferably be formed by a valve disc 57, the valve shoulder 59 of which is preferably in contact with a valve seat surface 61 of the valve block 21. The valve disc 57, with the valve seat surface 61, can form an inflow chamber 63, into which the flow of damping medium from the other valve 43 empties, and from which the damping medium flow of the first valve 39 is discharged. Pressure is preferably applied to the valve disc by a spring 65 which is supported on the housing cap 37. The housing cap 37 can be axially adjusted by means of a thread so that it can be used to change the amount of pressure exerted.

Referring again to FIG. 1A, in this embodiment, a threading 103 is formed in the adjacent outside walls 35a of each of the valve housings 35 and each of the interior walls 37a of the housing caps 37. Disposed between the outside walls 35a of the valve housings 35 and interior walls 37a of the housing caps 37 is a seal, O-ring, or ring gasket 106, which is seated in a circumferencial groove 37b in the interior walls 37a of the housing caps 37. Further, in both the left and right valve housings, the valve disc 57 of the second valve 41 is sealed against the outside diameter wall 39b of the valve guide 39a by means of a seal, O-ring, or ring gasket 104. This seal 104 is seated within a circumferencial recess 57b in the interior wall 57a of the valve disc 57. This seal 104 allows the valve disc 57 to move axially along the outside diameter walls 39b of valve guide 39a in response to pressure from the damping medium.

The construction of the second valve and of the additional valve in the right valve housing 35 in the figure is basically the same as that described above. But one difference is that, instead of the spring-loaded ball, the first valve 39 can have a regulating needle 67 which has a conical tip and which can be adjusted by means of a thread inside the housing cap 37, to define the cross section of the throttle 45.

Referring once again to FIG. 1A, preferably, a seal, O-ring or ring gasket 110 is disposed in the right-hand first valve 39, within the valve guide 39a, to the right of the conical tip 67a of the regulating needle 67. This seal 110 provides a damping fluid seal, as well as possibly an adjustment guide for conical tip 67a when regulating needle 67 is adjusted.

The vibration damper can be constructed according to the single tube principle, whereby a gas-filled compensation chamber 69 compensates for the volume differences of the displaced damping medium. A separating piston 71 preferably separates the compensation chamber 69 from the lower working chamber 11. So that the lower connection opening 17 in the fluid connection 19 cannot be blocked or connected with the compensation chamber, there is a stop 73 which limits the axial movement of the separating piston.

Referring again to FIG. 1A, preferably, a seal is formed between the exterior wall 71a of the separating piston 71 and the interior wall 7a of the cylinder 7 by the insertion of a seal, O-ring, or ring gasket 107, between these walls 71a and 7a. This seal 107 is seated in a circumferencial recess 71b in the exterior wall 71a of the piston 71. This seal 107 provides a structure whereby the separating piston 71 can move axially within the cylinder 7 and yet effectively seal the gas-filled compensation chamber 69.

When the damper is in operation, the piston rod 3 is preferably pushed into the cylinder 7. The displaced volume of damping medium preferably escapes from the lower working chamber 11 through the connection opening 17 into the fluid connection 19 via the passage 33 which runs radially into the right valve housing 35. The additional valve 43 closes, so that the damping medium arrives in the inflow chamber 63. As a function of the insertion speed of the piston rod, the damping medium escapes essentially only by way of the pilot cross section defined by the regulating needle 67, or also between the valve seat surface 61 and the valve shoulder 59 when the valve disc 57 is raised. The damping medium preferably flows into the valve housing 35 and flows via an open non-return valve 75 into the fluid connection 19. The non-return valve 75 can essentially ensure a directionally-dependent flow through the right valve housing. In a valve system which has a first valve 49 constructed as in the left valve housing, the non-return valve 75 can be omitted. In that case, the spring-loaded ball 47 preferably acts as a non-return valve.

The operation of the damping valve system in the left valve housing, which generates a damping force in the decompression direction, is essentially identical to the description given above for the compression direction. The two different types of system can be used alternatively or in combination. During an outward movement of the piston rod, the non-return valve 75 in the right valve is preferably closed, so that essentially no damping medium can flow by way of the connection opening 15 and the fluid connection 19 into the right valve. As a function of the performance characteristics and/or the desired damping forces, the damping force response curve can be adjusted by means of the adjustment devices. The first valve thereby can determine the initial response curve, and the second valve can determine the middle velocity range of the response curve, while the additional valve can be used for the peak velocities of the piston rod, to realize a gradual final portion of the damping force response curve. A plurality of valves can also be used in the construction of the additional valves.

Referring once again to FIG. 1A, in one embodiment, the directionally-dependant flow in non-return valve 75 is accomplished by means of a valve disc 102 which is located between spring 101 and valve seat surface 35b. This spring 101 and valve disc 102 allow the non-return valve 75 to only open on a downward movement of the piston rod 3.

So that an inadvertent adjustment of the adjustment means in the "hard" direction of the damping force response curve does not damage the vibration damper or the vehicle, additional piston valves 77 which act as pressure relief valves can be used.

In the preceding description, the adjustment means are essentially always described as simple mechanical components. Alternatively, other adjustment means which operate on the basis of magnetic, hydraulic or electronic forces can also be used.

Figure 2:
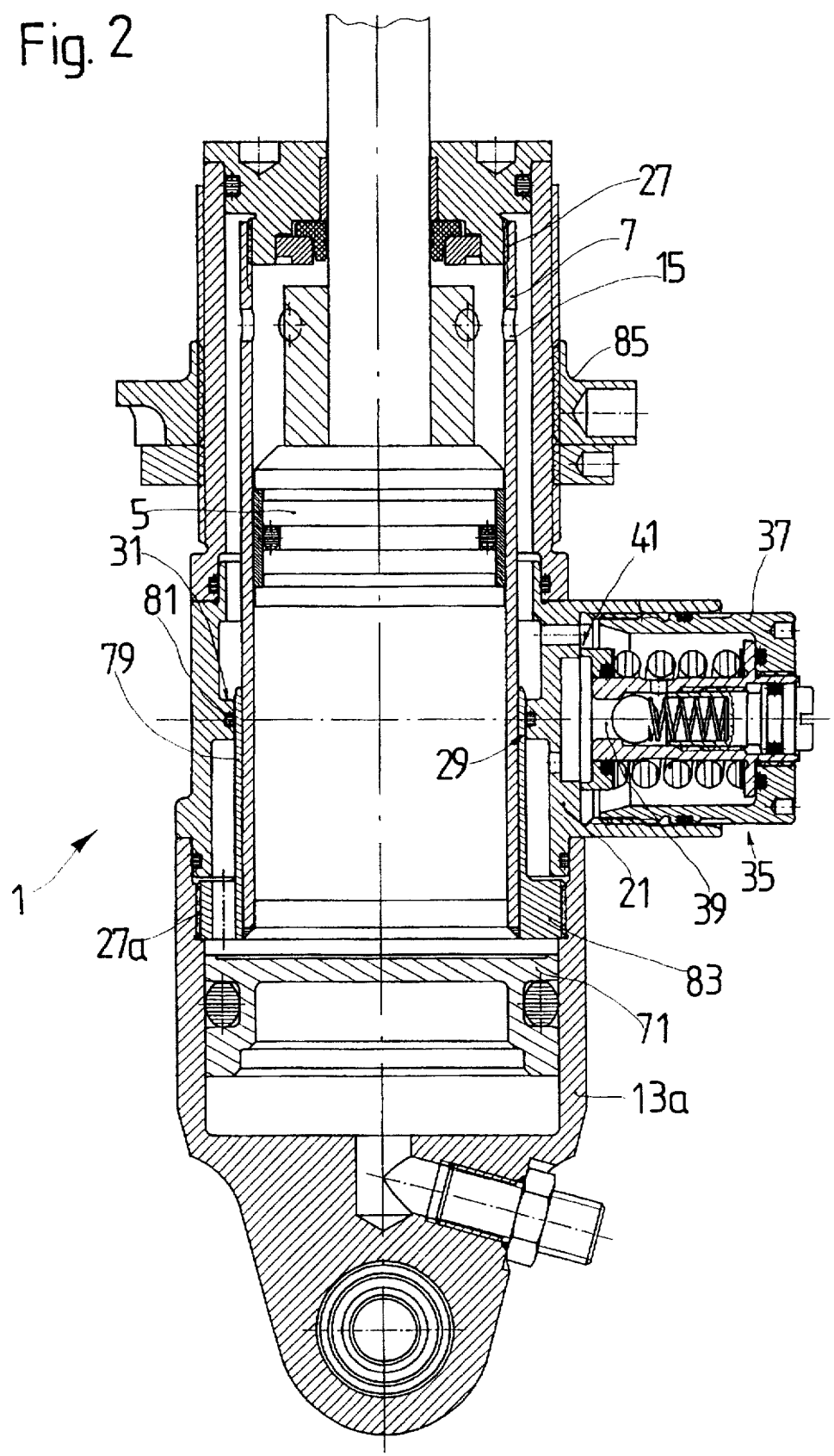
FIG. 2 shows an additional embodiment of a vibration damper similar to the embodiment illustrated in FIG. 1.

The vibration damper illustrated in FIG. 2 is essentially the same as the one illustrated in FIG. 1. In contrast, however, this vibration damper 1 has two valves 39; 41 which can be adjusted from outside, whereby the end cap 37 inside the valve housing 35 can be displaced or pushed inside the valve housing 35. To enlarge the pressurized surface area of the separating piston 71, the separating piston 71 can be located so that it slides inside the container tube 13a.

Figure 2A:
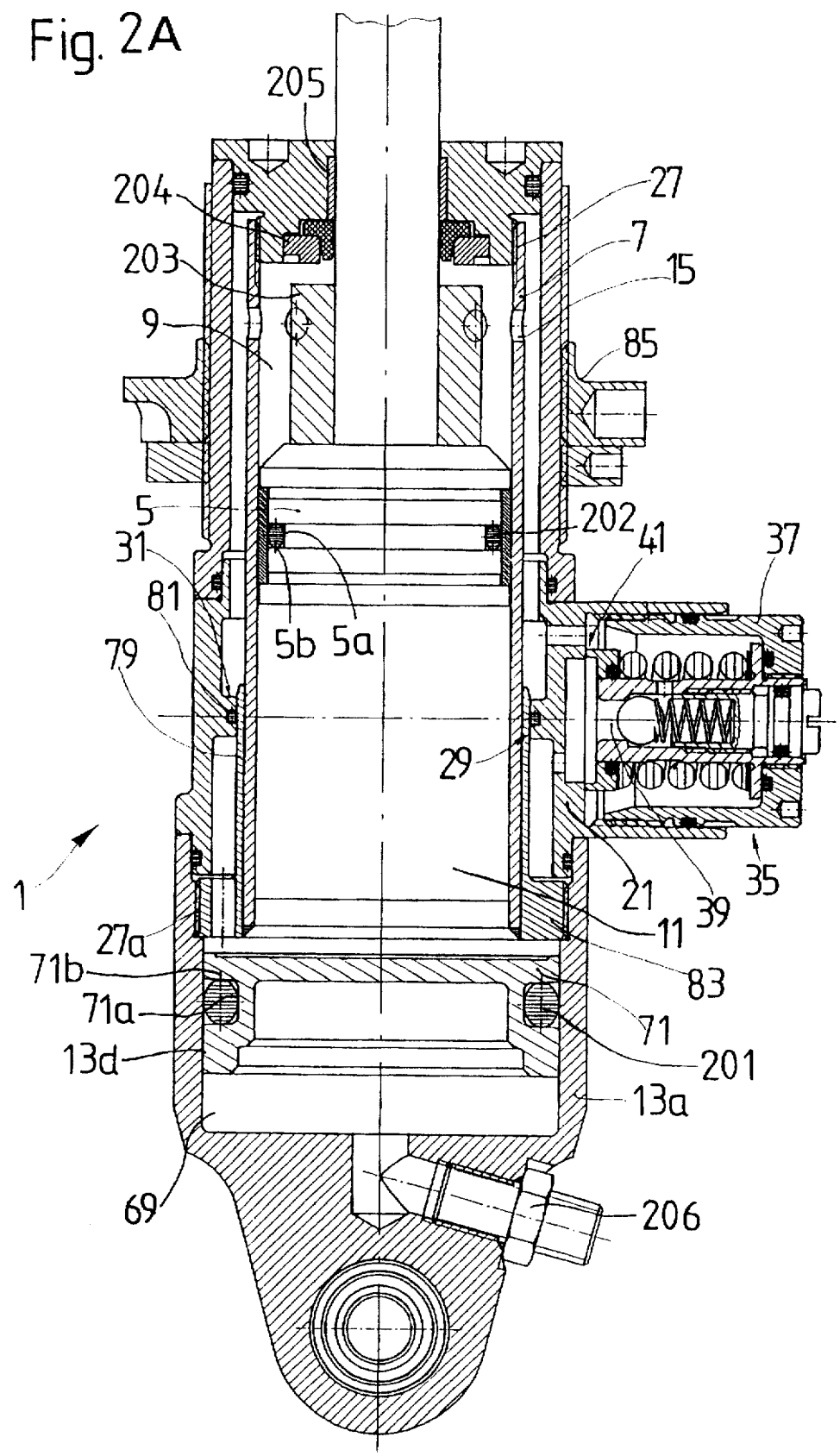
FIG. 2A is essentially the same view as FIG. 2, but more detailed.

Referring now to FIG. 2A, preferably, a seal is formed between the exterior wall 71a of the separating piston 71 and the interior wall 13d of the container tube 13a by the insertion of a seal, O-ring, or ring gasket 201 between these walls 71a and 13d. This seal 201 is preferably seated in a circumferencial recess 71b in the exterior wall 71a of the separating piston 71, thereby providing both a structure or guide for the axial movement of the separating piston 71, as well as a seal for the compensation chamber 69.

A further difference can be found in the configuration of the cylinder 7. In the vicinity of the central opening 29 of the valve block 21, the cylinder has an outside diameter which is expanded by means of a sleeve 79. Thus the inside diameter of the cylinder 7 essentially remains intact or constant as a sliding surface for the piston 5. The expanded outside diameter can make it possible to enlarge the central opening as well as the ring gasket 81 which is preferably inserted in the web 31. Consequently, the ring gasket 81 is not pushed through the connection openings 15 during the assembly of the vibration damper, which essentially prevents damage.

Further, again referring to FIG. 2A, one embodiment includes a seal, O-ring, or ring gasket 202 inserted between the exterior wall 5a of the piston 5 and the inside diameter 7a of cylinder 7. This seal 202 is seated in a recess 5b in the exterior wall 5a of the piston 5, thereby providing a structure or guide for the axial movement of the piston 5. This piston 5 and seal 202 provide effective separation of the upper and lower working chambers 9; 11. FIG. 2A also illustrates a number of additional structures, such as support structures 204 and 205, a stop 203, and an additional valve member 206 connected to the compensation chamber 69, which may be used in the vibration damper.

The threaded connection 27a between the cylinder 7 and the lower container tube part 13a is preferably made by means of an encircling fastening edge or flange 83 which can be welded onto the cylinder 7. The fastening edge essentially acts as a stop for the separating piston, and is thereby preferably realized in one piece with the sleeve 79. Of course, other types of connections can also be used instead of the threaded connections 27; 27a.

Basically, no forces act in the peripheral direction on the valve block. To reduce the weight of the vibration damper, the use of aluminum is preferred for the parts of the container tube, whereby the greater coefficient of thermal expansion of aluminum compared to that of a steel cylinder has the effect that the bias exerted by the parts on the valve block continues to increase during operation of the damper. The forces which can be absorbed in the peripheral direction are also thereby increased.

In addition to the features of the vibration damper illustrated in FIG. 1, the vibration damper illustrated in FIG. 2 has a spring plate 85, the height of which can be adjusted, and which can preferably be fixed in place by means of a lock nut.

One feature of the invention resides broadly in the vibration damper with adjustable damping force comprising a cylinder in which a piston with a piston rod is guided so that it can move axially, whereby the piston divides the cylinder into a first and a second working chamber, and at least one damping valve which is located in a flow connection between the two working chambers and can be influenced in terms of its damping force response curve by means of external adjustment means, characterized by the fact that the damping valve consists of single or individual valves, the action of which is cumulative, whereby a first single valve 39 consists of a throttle 45 which has a small cross section, and a second single valve 41 comprises at least one valve disc 57 which is under a spring load, and whereby the action of the first and second single valves can be adjusted individually by means of the adjustment means 51; 67; 37.

Another feature of the invention resides broadly in the vibration damper characterized by the fact that at least one additional single valve 43 is realized in the form of a throttle passage 53 which has a larger cross section, whereby the action of the additional single valve can be adjusted by means of adjustment means 55.

Yet another feature of the invention resides broadly in the vibration damper characterized by the fact that there are separate damping valves for the decompression and compression directions for the second single valve 41 and each of the additional single valves 43.

Still another feature of the invention resides broadly in the vibration damper characterized by the fact that there are separate first single valves for each of the decompression and compression directions, which single valves are actively connected to non-return valves 47; 75.

A further feature of the invention resides broadly in the vibration damper characterized by the fact that the throttle 45 of the first single valve 39 can be adjusted by means of an adjusting needle 67.

Another feature of the invention resides broadly in the vibration damper characterized by the fact that the throttle 45 of the first single valve 39 is provided with a spring-loaded closing body 47.

Yet another feature of the invention resides broadly in the vibration damper characterized by the fact that on the second single valve 41, the spring bias can be adjusted by means of at least one spring 65 which acts on the valve disc 57.

Still another feature of the invention resides broadly in the vibration damper characterized by the fact that the additional single valve 43 has a set screw or regulating screw 55 which can be adjusted to change the passage cross section of the throttle 53.

A further feature of the invention resides broadly in the vibration damper with adjustable damping force, comprising a cylinder in which a piston with a piston rod is guided so that it can move axially, whereby the piston divides the cylinder into a first and a second working chamber, and at least one damping valve which is located in a flow connection between the two working chambers and can be influenced in terms of its damping force response curve by means of external adjustment means, characterized by the fact that the single valves for at least one flow direction are located in a valve block 21 which is in communication by means of at least one fluid connection 19 with the cylinder 7, whereby the container tube 13, 13a is realized in two parts which extend respectively above and below the valve block 21.

Another feature of the invention resides broadly in the vibration damper characterized by the fact that to adjust the second valve 41, the spring 65 is supported on a housing cap 37 which can be adjusted axially.

Yet another feature of the invention resides broadly in the vibration damper characterized by the fact that the fluid connection 19 is formed by the container tube 13, 13a which surrounds the cylinder 7.

Still another feature of the invention resides broadly in the vibration damper characterized by the fact that the working chambers 9; 11 each have at least one connection opening 15; 17 to the fluid connection 19.

A further feature of the invention resides broadly in the vibration damper characterized by the fact that the valve block 21 has a central opening 29 to hold the cylinder 7, and channels 33 which run radially from this central opening to the single valves.

Another feature of the invention resides broadly in the vibration damper characterized by the fact that the piston 5 has at least one throttled fluid connection 77 between the working chambers 9, 11.

Yet another feature of the invention resides broadly in the vibration damper characterized by the fact that the vibration damper 1 is realized in the form of a single-tube damper, in the cylinder 7 of which a gas-filled compensation or equalization chamber 69 is formed by at least one separating piston 71, whereby a stop 73 forms a stroke limit for the separating piston.

Still another feature of the invention resides broadly in the vibration damper characterized by the fact that the container tube 13; 13a is made of aluminum.

A further feature of the invention resides broadly in the vibration damper characterized by the fact that the cylinder 7 has an expanded diameter in the vicinity of the central opening 29 of the valve block 21.

Another feature of the invention resides broadly in the vibration damper characterized by the fact that the expanded diameter is formed by a sleeve 79 which is pushed onto the cylinder 7.

Yet another feature of the invention resides broadly in the vibration damper characterized by the fact that the cylinder 7 has an encircling fastening edge 83 which enters into a fastening connection 27a with the lower part 13a of the container tube.

Still another feature of the invention resides broadly in the vibration damper characterized by the fact that the fastening edge has the connection opening(s) 17.

A further feature of the invention resides broadly in the vibration damper characterized by the fact that the fastening edge 83 and the sleeve 79 are realized in one piece.

Another feature of the invention resides broadly in the vibration damper characterized by the fact that the separating piston 71 is located so that it slides inside the container tube 13a.

Examples of adjustable vibration dampers and components thereof which could possibly be used in conjunction with the embodiments of the present invention as set forth hereabove can possibly be found in U.S. Pat. No. 5,375,683, entitled "Controllable Vibration Damper for Motor Vehicles;" U.S. Pat. No. 5,335,757, entitled "Hydraulic Adjustable Vibration Damper;" U.S. Pat. No. 5,251,730, entitled "Adjustable Vibration Damper;" U.S. Pat. No. 5,301,776, entitled "Hydraulic Adjustable Vibration Damper;" U.S. Pat. No. 5,265,703, entitled "Adjustable Hydraulic Vibration Damper for Motor Vehicles;" U.S. Pat. No. 5,350,187, entitled "Adjustable Damping System," U.S. Pat. No. 4,986,363, entitled "Adjustable Vibration Dampers for Motor Vehicles;" U.S. Pat. No. 5,107,969, entitled "Controllable Vibration Damper;" U.S. Pat. No. 4,973,854, entitled, "Hydraulic Shock-Absorber and Vibration Damper with Adjustable Damping;" and U.S. Pat. No. 5,143,185, entitled, "Controllable Hydraulic Vibration Damper for Automotive Vehicles."

Examples of vibration dampers with pistons having one or more piston valves connecting the working chambers, can possibly be found in U.S. Pat. No. 4,850,461, entitled "Shock Absorber Having a Throttle With a Variable Cross Section;" U.S. Pat. No. 5,207,300, entitled "Hydraulic, Adjustable Vibration Damper for Motor Vehicles;" U.S. Pat. No. 5,042,624, entitled "Hydraulic Shock Absorber with Pre-loaded Valve for Linear Variation Characteristics of Damping Force;" U.S. Pat. No. 5,072,812, entitled "Hydraulic Shock Absorber;" and U.S. Pat. No. 5,154,263, entitled "Method and Apparatus for Controlling the Flow of Damping Fluid Through a Piston."

Examples of O-rings as a sealing and/or guiding structure, and which may be utilized in accordance with at least one embodiment of the present invention, can possibly be found in U.S. Pat. No. 4,444,466, entitled "Universal Joint Seal and Vibration Damper for Remotely Actuated Pivotal Devices;" U.S. Pat. No. 4,372,624, entitled "Dynamic O-ring Seal;" U.S. Pat. No. 4,577,831, entitled Calibrated Hand knob Assembly; and U.S. Pat. No. 4,502,695, entitled "Mechanical Seal With Fluid Flow-Reversing Means."

Examples of other adjustment means or controls which may utilized in accordance with at least one embodiment of the present invention, can possibly be found in U.S. Pat. No. 5,350,187, entitled "Adjustable Damping System;" and U.S. Pat. No. 5,265,703, entitled "Adjustable Hydraulic Vibration Damper for Motor Vehicles;" U.S. Pat. No. 5,301,776, entitled "Hydraulic Adjustable Vibration Damper;" U.S. Pat. No. 4,989,148, entitled "Apparatus for the Computer Assisted Control of Vibration Dampers of A Vehicular Suspension System as a Function of the Roadway;" U.S. Pat. No. 4,850,460, entitled "Hydraulic Adjustable Shock Absorber;" U.S. Pat. No. 4,802,561, entitled "Adjustable Shock Absorber;" U.S. Pat. No. 4,723,640, entitled "Adjustable Hydraulic Vibration Damper;" U.S. Pat. No. 4,635,765, entitled "Adjustable Hydraulic Damper Apparatus;" U.S. Pat. No. 4,785,920, entitled "Hydraulic Adjustable Shock Absorber;" and U.S. Pat. No. 4,749,069, entitled "Vibration Damper for Motor Vehicles Having an Arrangement for Varying Damping Thereof."

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 43 109.0, filed on Dec. 3, 1994, having inventor Theo Rottenberger, and DE-OS P 44 43 109.0 and DE-PS P 44 43 109.0, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper with adjustable damping force, said vibration damper comprising:

a cylinder;

a piston having a piston rod sealingly projecting into said cylinder;

damping fluid;

said piston being guided within said cylinder and being movable axially with respect to said cylinder;

said piston dividing said cylinder into a first and a second working chamber;

a flow connection between said first and second working chambers to bypass said damping fluid between said first and second working chambers;

at least one damping valve being disposed in said flow connection;

said at least one damping valve comprising at least two single valves;

said at least two single valves comprising a first single valve and a second single valve;

said first single valve and said second single valve being disposed to together provide a cumulative damping action for their corresponding damping valve;

said first single valve comprising a throttle passage;

said second single valve comprising at least one valve disc;

a biasing mechanism to apply pressure to said valve disc;

adjustment apparatus to selectively adjust the damping force response curve of said at least one damping valve;

said adjustment apparatus comprising an arrangement to individually adjust the damping action of said first and second single valves;

said at least one damping valve comprising a third single valve;

said adjustment apparatus comprising an arrangement to individually adjust said third single valve;

said third single valve comprising a throttle passage having a first cross-section dimension;

said throttle passage of said first single valve having a second cross-section dimension;

said first cross-section dimension being larger than said second cross-section dimension; and said adjustment apparatus comprising external adjustment apparatus being accessible from the exterior of said vibration damper.

2. The vibration damper according to claim 1, wherein said first single valve and said second single valve are disposed in series with one another such that during at least part of the damping action the damping fluid flow in one of said first and second single valves is substantially wholly directed through the other of said first and said second single valves.

3. The vibration damper according to claim 2, wherein:

said at least one damping valve comprises a first damping valve and a second damping valve;

said piston having a compression direction of movement and a decompression direction of movement;

said compression direction being axially inward, and said decompression direction being axially outward;

said first damping valve being configured to operate in response to the flow of damping fluid resultant of the axial inward movement of said piston;

said second damping valve being configured to operate in response to the flow of damping fluid resultant of the axial outward movement of said piston; and said first damping valve and said second damping valve each comprise a separate one of said second single valve and said third single valve.

4. The vibration damper according to claim 3, wherein:

said at least two single valves comprise separate first single valves for each of the decompression and compression directions of movement of said piston;

said said first and second damping valves each comprise a non-return valve; and said first single valves are actively connected to a corresponding one of said non-return valves.

5. The vibration damper according to claim 4, wherein:

said throttle passage of each of said first single valves are provided with one of: a spring-loaded closing body and an adjusting needle for adjusting said throttle passage;

said biasing mechanism to apply pressure to said valve disc of said second single valve comprises at least one spring;

said spring provides means for adjusting said biasing mechanism; and said third single valve has one of: a set screw and a regulating screw which can be adjusted to change the cross-section of said throttle passage.

6. The vibration damper according to claim 5, wherein:

said vibration damper further comprises a valve block and a container tube;

said at least one damping valve is disposed in said valve block;

said valve block being in communication by means of at least one fluid connection with said cylinder;

said container tube comprises two parts which extend respectively above and below said valve block; and said valve block is rotatable about said container tube to position said valve block in a plurality of positions.

7. A vibration damper with adjustable damping force, comprising:

a cylinder in which a piston with a piston rod is guided so that it can move axially;

said piston dividing the cylinder into a first and a second working chamber;

a flow connection between the two working chambers;

at least one damping valve located in said flow connection;

said at least one damping valve being influenced in terms of its damping force response curve by adjustment apparatus;

single valves for at least one flow direction;

said single valves for at least one flow direction being disposed in a valve block;

said valve block being in communication by means of at least one fluid connection with said cylinder;

a container tube;

said container tube comprising two parts which extend respectively above and below said valve block;

said valve block being rotatable about said container tube to position said valve block in a plurality of positions; and said adjustment apparatus comprising external adjustment apparatus being accessible from the exterior of said vibration damper.

8. The vibration damper according to claim 7, wherein:

said single valves comprise a first single valve and a second single valve; and said external adjustment apparatus comprises apparatus to adjust the second single valve, said external adjustment apparatus comprising a spring supported on a housing cap, said housing cap being adjustable axially.

9. The vibration damper according to claim 8, wherein said fluid connection is formed by said container tube, said container tube surrounding said cylinder.

10. The vibration damper according to claim 9, wherein said first and second working chambers each have at least one connection opening to said fluid connection.

11. The vibration damper according to claim 10, wherein said valve block has a central opening to hold said cylinder, and channels which extend radially from said central opening to said single valves.

12. The vibration damper according to claim 11, wherein said piston has at least one throttled fluid connection between said first and second working chambers.

13. The vibration damper according to claim 12, wherein said vibration damper further comprises:

at least one separating piston disposed in said cylinder;

a gas-filled compensation chamber;

a stop; and said gas-filled compensation chamber being formed by said at least one separating piston; and said stop forms a stroke limit for said separating piston.

14. The vibration damper according to claim 13, wherein said container tube is made of aluminum.

15. The vibration damper according to claim 11, wherein said cylinder has an expanded diameter in the vicinity of said central opening of said valve block.

16. The vibration damper according to claim 15, wherein said expanded diameter is formed by a sleeve having been pushed onto said cylinder.

17. The vibration damper according to claim 16, wherein said cylinder has an encircling fastening edge which enters into a fastening connection with a lower part of said container tube.

18. The vibration damper according to claim 17, wherein:

said fastening edge has at least one of said connection openings;

said fastening edge and said sleeve are realized in one piece; and said at least one separating piston is located so that said at least one separating piston slides inside said container tube.

* * * * *